United States Patent
Hyppias et al.

(10) Patent No.: US 10,164,486 B2
(45) Date of Patent: Dec. 25, 2018

(54) OPTIMIZED ELECTRIC MOTOR WITH NARROW TEETH

(71) Applicant: MOVING MAGNET TECHNOLOGIES (MMT), Besançon (FR)

(72) Inventors: Arnaud Hyppias, Fraisans (FR); Stéphane Tavernier, Besançon (FR); Stéphane Biwersi, Frambouhans (FR)

(73) Assignee: Moving Magnet Technologies (MMT), Besancon (FR)

( * ) Notice: Subject to any disclaimer, the term of this patent is extended or adjusted under 35 U.S.C. 154(b) by 308 days.

(21) Appl. No.: 14/417,710

(22) PCT Filed: Jul. 30, 2013

(86) PCT No.: PCT/FR2013/051830
§ 371 (c)(1),
(2) Date: Jan. 27, 2015

(87) PCT Pub. No.: WO2014/020273
PCT Pub. Date: Feb. 6, 2014

(65) Prior Publication Data
US 2015/0263572 A1    Sep. 17, 2015

(30) Foreign Application Priority Data

Aug. 1, 2012 (FR) ..................... 12 57469

(51) Int. Cl.
*H02K 1/14* (2006.01)
*H02K 29/03* (2006.01)
(Continued)

(52) U.S. Cl.
CPC ............. *H02K 1/148* (2013.01); *H02K 1/146* (2013.01); *H02K 1/2706* (2013.01);
(Continued)

(58) Field of Classification Search
CPC .... H02K 1/00–1/34; H02K 1/148; H02K 1/27
(Continued)

(56) References Cited

U.S. PATENT DOCUMENTS 6,144,132 A * 11/2000 Nashiki ................ H02K 1/2713
310/152
6,144,137 A * 11/2000 Engelbert ............ B62D 5/0403
310/410

(Continued)

FOREIGN PATENT DOCUMENTS

FR        2890498 A1    3/2007
JP     2002199630 A    7/2002
(Continued)

OTHER PUBLICATIONS

J.R. Hendershot Jr., Design of Brushless Permanent-Magnet Motors, Magna Physics Publishing and Clarendon Press Oxford 1994, pp. 10, 12 and 13.*

(Continued)

Primary Examiner — Thomas Truong
(74) Attorney, Agent, or Firm — Harness, Dickey & Pierce, PLC (57) ABSTRACT

The present disclosure relates to a mono- or polyphase electric motor including a stator carrying at least three coils and consisting of 12×N straight teeth extending radially, N being an integer greater than or equal to 1, and of an equal peak divergence alpha, measured at their end from the center of the motor, and a rotor exhibiting P pairs of magnetized poles such that P=5+2×R, P being a non-multiple of three, R being an integer greater than or equal to 0, alpha lying between 360°(12×N)/3 and 360°(12×N)/2.

20 Claims, 7 Drawing Sheets

(51) Int. Cl.
*H02K 1/27* (2006.01)
*H02K 7/116* (2006.01)

(52) U.S. Cl.
CPC .......... *H02K 1/2793* (2013.01); *H02K 7/116* (2013.01); *H02K 29/03* (2013.01); *H02K 1/141* (2013.01); *H02K 2213/03* (2013.01)

(58) Field of Classification Search
USPC .................................. 310/216.001–216.137
See application file for complete search history.

(56) References Cited

U.S. PATENT DOCUMENTS

| | | | |
|---|---|---|---|
| 6,335,582 B1 | 1/2002 | Abukawa et al. | |
| 6,747,386 B2* | 6/2004 | Fujinaka | H02K 29/03 310/216.074 |
| 7,215,059 B1* | 5/2007 | Bitsche | H02K 3/522 310/216.075 |
| 7,595,577 B2 | 9/2009 | Niguchi et al. | |
| 8,102,093 B2 | 1/2012 | Prudham | |
| 8,339,003 B2 | 12/2012 | Prudham | |
| 8,434,584 B2 | 5/2013 | Feuerrohr | |
| 8,860,282 B2 | 10/2014 | Gandel et al. | |
| 8,872,397 B2 | 10/2014 | Nonaka | |
| 2002/0117925 A1* | 8/2002 | Wauke | G11B 19/2009 310/185 |
| 2008/0197743 A1* | 8/2008 | Matsubara | H02K 1/02 310/216.111 |
| 2009/0174280 A1* | 7/2009 | Prudham | H02K 1/14 310/216.022 |
| 2011/0018384 A1* | 1/2011 | Kenjo | H02K 1/148 310/216.092 |
| 2011/0037338 A1* | 2/2011 | Leiber | H02K 1/148 310/215 |
| 2011/0309711 A1* | 12/2011 | Brown | H02K 1/148 310/216.007 |
| 2012/0043155 A1* | 2/2012 | Feuerrohr | H02K 1/146 180/443 |
| 2012/0104905 A1 | 5/2012 | Prudham et al. | |
| 2014/0283732 A1 | 9/2014 | Heinrich | |

FOREIGN PATENT DOCUMENTS

| | | |
|---|---|---|
| JP | 2002252954 A | 9/2002 |
| JP | 2008228363 A | 9/2008 |
| WO | WO-9307672 A1 | 4/1993 |

OTHER PUBLICATIONS

Hanselman, Duane C. "Brushless Permanent-Magnet Motor Design". Published Jan. 1, 1994; pp. 106-107.

* cited by examiner

OPTIMIZED ELECTRIC MOTOR WITH NARROW TEETH

CROSS-REFERENCE TO RELATED APPLICATIONS

This application is a National Phase Entry of International Application No. PCT/FR2013/051830, filed on Jul. 30, 2013, which claims priority to French Patent Application Serial No. 1257469, filed on Aug. 1, 2012, both of which are incorporated by reference herein.

TECHNICAL FIELD

The present invention relates to the field of electric motors, and more particularly to low to medium energy mono- or polyphase permanent magnet machines, i.e. capable of delivering output power up to a few kilowatts.

BACKGROUND

Electric machines performances are characterized by a certain number of factors, the importance of which depends on the type of targeted applications. A major sizing element is the motor constant, also called Km, and expressed in torque units per Watt square root, i.e. reflecting the torque that the motor can generate for a given power consumption in the coils. Another factor which may be important is the torque without current, which must often be reduced as much as possible for various reasons (noise, loss, mechanical wear, geared motor reversibility . . . ).

Within the scope of this patent, optimizing the motor constant for given axial overall dimensions and diameter will be our concern, while striving to have a motor with a minimum torque without current in motors having a "radial" topology, i.e. having a plane flow and radially extending teeth. The axial overall dimension will be defined here as the height of the stator plus the height of the coils heads above the stator. More generally, the capacity of industrializing such a motor is obviously a background factor to be taken into account. Eventually, we will also be preferentially interested by structures with balanced radial forces (making it possible to solve problems such as noise or wearing of rotor guide elements). The criteria mentioned above generally lead to compromises in the definition of structures that do not always enable to obtain an optimized structure.

For low to medium power motors, topologies with 6 or 12 stator teeth are currently found, with the 12 teeth topology making it possible to obtain the best performance in terms of Km. The stator topologies having 12 teeth with equal peak divergences make it possible to eliminate, in association with magnetized rotors having a number of pairs of poles equal to 5+2R (with R being an integer) and not a multiple of 3, the harmonics of the torque without current up to the $12^{th}$ row (excluded). The first appearing and majority harmonic thus has a period 12 times smaller than the electric period of the motor. As the amplitude of the harmonics decreases with their row, these motors are particularly valuable for applications requiring a minimum torque in the absence of current.

The U.S. Pat. No. 7,595,577 is known in the prior art which relates to a motor having 12 equal teeth extended at their ends on the stator. This solution is a classic way to minimize the torque without current in demanding applications in the field. As a matter of fact, as the torque without current is linked to the preferred positions that the magnet rotor can take due to the gaps between the stator teeth, it seems wise to minimize these spaces, or even in some cases to eliminate these by contacting the teeth in order to reduce the twelfth harmonic.

However, this type of solution has several drawbacks. First, the closer position of, or the contact between the teeth, induces leakage fluxes which affect the motor performances, even though the contact areas (commonly called necks) are so arranged as to be magnetically saturable. Moreover, these topologies require either a direct winding in the slots, or executing the stator in several subsets, which may be annoying in terms of industrial production. Eventually, the space available for the copper of the windings is not optimal.

The German patent application DE102009000681 is also known, which describes an electric machine comprising: a rotor having 14 poles, with the rotor being so arranged as to be rotatable about a central axis, and a stator having 12 stator teeth which protrude in a radial direction relative to the central axis in the direction of the rotor characterized in that each stator tooth is provided with a stator coil, wherein two adjacent stator coils are each time connected in series to each other to form a pair of stator coils, with one pair of stator coils being associated with a phase being each time connected to a dedicated neutral point, so to form a star point circuit. For this type of embodiment of the prior art, the straight tooth synchronous machine provides for a tooth width as wide as that of the notches, generally a tooth width of about 15°. The figures of patent DE102009000681 do not make it possible to clearly understand the peak divergence of the teeth, which moreover varies from one tooth to another, with values of 15.1° or 15.8° in FIG. 3 of this document of the prior art.

The patent EP0872943 discloses another example of an electrodynamic rotating machine with permanent magnets having a stator with a concentrated winding.

The patent application WO93/07672 is also known, which relates to a structure of motor with straight teeth. However, the proposed topology has 4 pairs of magnetic poles on the rotor, which does not allow a natural compensation of the sixth harmonic of the residual torque and requires modifications to be brought to the shape of the rotor magnets in order to reduce the residual torque. Besides, if this structure uses straight teeth, the latter have a large width (approximately 50% of the pole pitch), which is not optimized.

In a certain number of its patents, the applicant provided solutions making it possible to remedy all or part of the disadvantages mentioned above by using straight teeth topologies associated with rotors having 5 or 7 pairs of poles while showing that configurations could be found, in terms of width of stator teeth, for which the torque without current could be eliminated or at least significantly minimized. In particular, the U.S. Pat. No. 8,102,093 relates to a motor having 12 straight stator teeth, with 6 being wound, and 6 not being wound, with the particularity that the wound teeth are at least twice as wide as the non wound teeth. The wide teeth carrying the coils thus make it possible to maximize the Km value under certain conditions thanks to an increased permeance. The teeth width is so selected as to obtain an optimal compensation of the sixth harmonic of the residual torque appearing due to the not equal width between the teeth.

This type of structure perfectly meets the needs for a reduction in the torque without current, for balanced radial forces, enables an independent winding on coil bodies added on the stator subsequently and leads to satisfactory levels of performance. However, if constant axial overall dimensions and diameter are used, it surprisingly appears to the persons skilled in the art that, in some cases, this topology does not lead to the optimal result and that it would be profitable to have equal but narrower teeth than the teachings of the prior art would suggest in order to optimize the motor Km value. For example, even though the height of the stator has to be reduced, when using larger winding coil heads, to keep a constant overall dimension, better configurations, in terms of Km value, are obtained with 12 narrow teeth having an equal width, than with 12 teeth having different sizes, and this with teeth widths smaller than half the pole pitch.

SUMMARY

The present invention thus aims at providing a solution to the problems mentioned above. More particularly, the invention aims at providing a mono- or polyphase electric motor comprising a stator carrying at least three coils and consisting of 12×N straight teeth extending radially (i.e. perpendicularly to the axis of rotation of the motor), with N being an integer greater than or equal to 1, and of an equal peak divergence alpha, measured at their ends from the centre of the motor, and a rotor having P pairs of magnetized poles such that P=5+2×R, with P being a non-multiple of three, R being an integer greater than or equal to 0, with alpha being between 360°/(12×N)/3 and 360°/(12×N)/2.

Preferably, the electric motor is characterized in that one tooth out of two carries a coil. In an alternative solution, the electric motor is characterized in that all the teeth carry coils. In a particular embodiment, the electric motor has three coils installed on teeth spaced by 60° and generally distributed over a tooth pitch (theta) of less than or equal to 120°.

If an even greater reduction in the torque without current is desired, methods can also be used for reducing, at least locally, the air gap between the teeth. The stator structure can thus be modified to obtain saturable necks over a part of the height, or to add one or more ferromagnetic ring(s). Thus, in a particular embodiment, the electric motor has a stator made of a stack of two different types of metal plates, with the adjacent stator teeth being in contact on the first type of metal plate by means of saturable magnetic necks.

In an alternative solution, the electric motor has at least one ferromagnetic ring inserted into the radial air gap between the stator teeth and the magnetic rotor. An electric motor having a stator which has two types of metal plates forming a recess adapted to receive a ferromagnetic ring can also be considered. According to another possible alternative solution, the electric motor has a stator with an outer ring positioned after the winding of the teeth so as to provide the closing of the magnetic circuit.

As regards the rotor, according to a preferred alternative solution, the magnet is of the ring type with alternating magnetic poles corresponding to a radial magnetization, or at least close to it. In this case, the rotor is inscribed in the stator. However, a disk-shaped magnet with a magnetization of the axial type may also be used, with the magnet then turning above the radially extending teeth, with the coils being radially recessed relative to the magnet.

BRIEF DESCRIPTION OF THE DRAWINGS

The invention will be better understood when examining the following figures.

DETAILED DESCRIPTION

Figure 1:
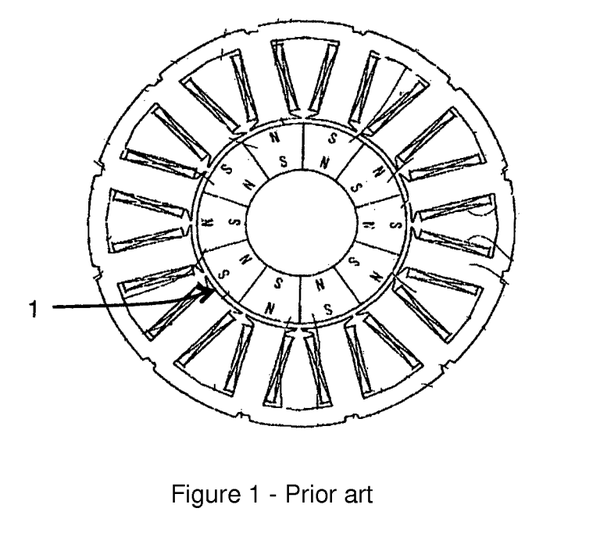
FIG. 1 shows a motor having 12 extended teeth according to the prior art.

FIG. 1 is a figure of U.S. Pat. No. 7,595,577 which relates to a motor having 5 pairs of magnetic poles on the rotor and 12 teeth wound on the stator, with each of said teeth having an extension 1 at their ends opposite the magnetized rotor. This embodiment is a typical representation of the solutions with teeth extended to minimize the torque without current with the defects identified in the preamble to this patent: leakage flux between the teeth, complexity of the winding, reduced space for the coils . . . .

Figure 2:
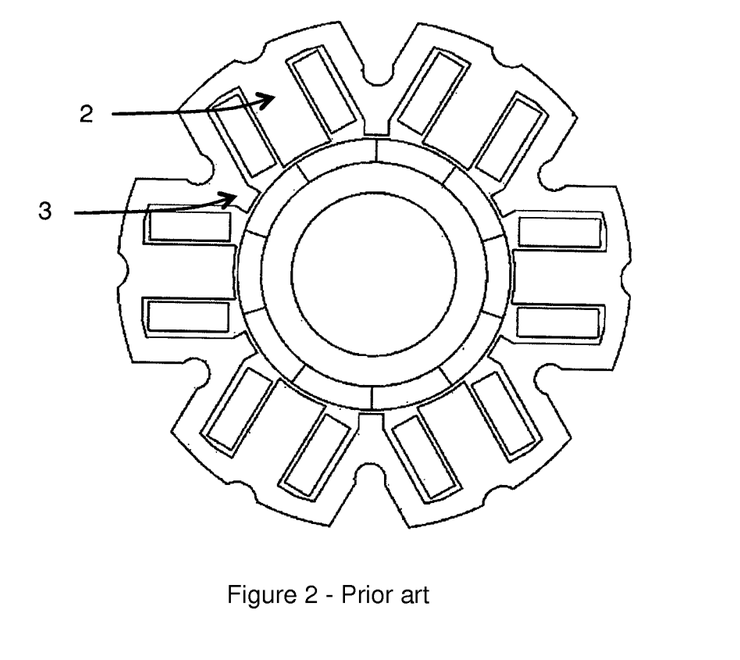
FIG. 2 shows a motor having 12 straight, 6 wide and 6 narrow teeth, according to the prior art.

The motor in FIG. 2 provides an appropriate solution to remedy these defects according to the applicant's patent FR2899396, which implements alternating large 2 and narrow 3 teeth, the peak divergence of which, as measured at the teeth ends facing the rotor varies from a factor above 2, typically 22° for the wide teeth and 10° for the narrow teeth, this still for a rotor having 5 pairs of magnetic poles like in the previous example. These different widths lead to an original compensation of the harmonics of the residual torque, while making it possible to clear a large space for the winding. However, under some circumstances, this solution may be restrictive if the maximum torque density for a given axial overall dimension is our concern, while aiming at a very low torque without current. In the first place, in spite of the method of harmonic compensation, the imperfections of the magnet will always prevent falling below a certain value of the torque without current.

Figure 3:
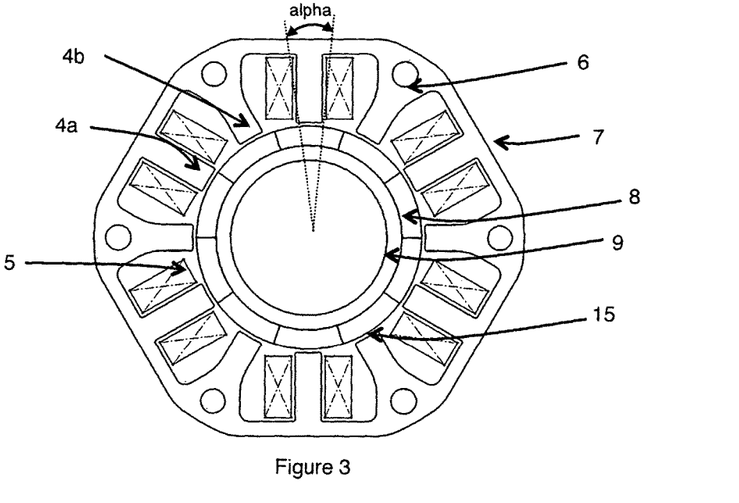
FIG. 3 shows a motor according to the invention in a first embodiment.

Now, a motor having 12 equal teeth has a natural compensation of the sixth harmonic (theoretically the first harmonic present is the twelfth harmonic). If this is combined with the reduction in the width of the teeth, it appears that, in some cases, better performances can be obtained, thanks to a greater volume of copper while avoiding an excessive saturation in these teeth. FIG. 3 illustrates, in a front view and in section, a motor having 12 teeth and 5 pairs of magnetic poles according to the invention having the same outer dimensions as that in FIG. 2 with identical radially extending narrow teeth 4a and 4b having a peak divergence alpha=13°—as measured on the ends of the teeth—. The section in a plane perpendicular to the radial median axis is rectangular, as well as the section along a transverse plane. The teeth 4a, 4b are oriented radially.

The stator 7 consists of teeth 4a, 4b and coils 5. One tooth 4a out of two is surrounded by an electric coil 5—typically made of copper or aluminum—with two coils 5 being spaced by a mechanical 180° around the centre of the motor, thus forming an electric phase and all the 6 coils 5 forming a three-phase motor. The teeth 4b which do not carry the coils 5 advantageously, but not restrictively, have bores 6 to enable the attachment of the metal plates composing the stator without affecting the magnetic performances and the magnetic flux return occurring at the back of the teeth 4a and 4b. These bores 6 are provided in the development area where the tooth enlarges to extend through a peripheral belt zone.

The rotor, separated by an air gap 15 from the stator 7, is typically composed of a ferromagnetic yoke 9 carrying magnetised poles 8 in the form of a radially magnetized—alternating North/South—multipolar uniform ring or quantized sectors uniformly magnetized so as to produce a magnetization close to a radial direction. A rotor may also be made by embedding magnets in a yoke following the numerous teachings in the art that can currently be found in this field.

For an equal motor height, formed by the metal plates thickness and the coils thickness, but thanks to a different distribution of such heights, a gain of about 7% in the Km value can be obtained with this motor having equal narrow teeth as compared to the motor shown in FIG. 2. In addition, such a motor has a better torque without current, less sensitive to variations induced by the magnet (inhomogeneity of the material, magnetization . . . ) thanks to the natural compensation of the sixth harmonic.

Figure 4:
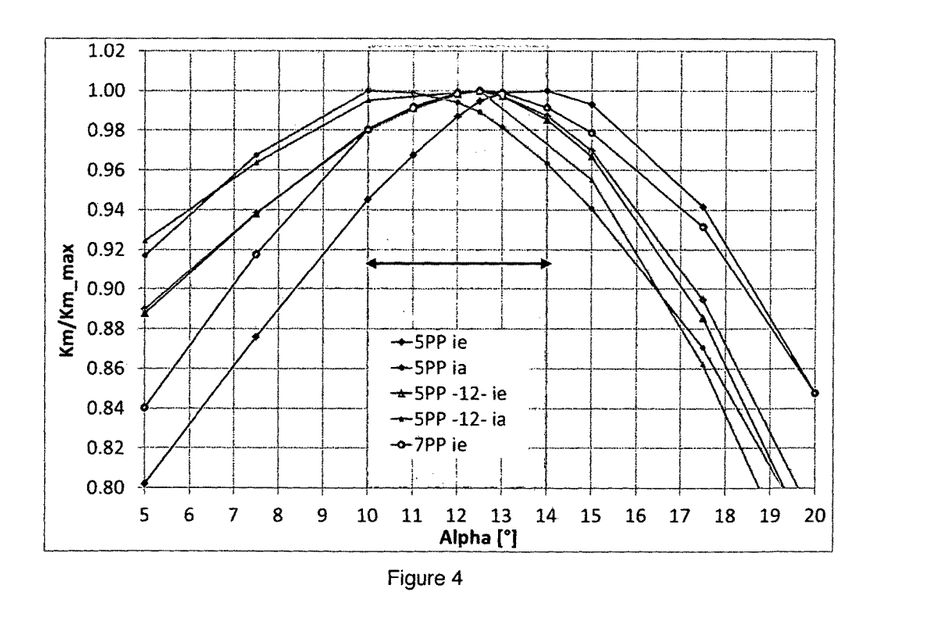
FIG. 4 shows the theoretical variation of the motor torque constant as a function of the width of the teeth in a motor having 12 equal narrow teeth, with a constant axial overall dimension.

FIG. 4 justifies selecting (for the case of the previous figure) the tooth width at 13° via a graph showing the variation in Km for three different motor configurations (5 and 7 pairs of poles with 6 wire wound teeth—called respectively 5PP and 7PP—, and 5 pairs of poles with 12 wire wound teeth—called 5PP-12—), and this with an iso-axial dimension (ie index), including the thickness of the coil buns, and with an iso-active length (ia index). The active length is the height of the stator metal plate measured in the direction of the axis of rotation 18 of the rotor. This FIG. 4 thus shows the evolution, as a function of the (alpha) width of the teeth, of the Km ratio for each given tooth width, to the maximum Km value observed on the angular range studied.

As can be seen, the optimum Km value for 5 pairs of poles/6 wound teeth is about 13° (or 360°/(12×N)/2.3), and the optimum values generally are in a range between 360°/(12×N)/3 and 360°/(12×N)/2, and more particularly 10° and 14° for 5 and 7 pairs of poles, if N=1 (12 teeth per stator) and whether an iso-overall dimension or an iso-active length comparison is considered. The claimed range is symbolized in this FIG. 4, by the width of the double arrow.

As discussed above, a classic solution to reduce the torque without current consists in using extended or even contacting teeth via saturable zones (called necks). In addition to the winding problems, this incurs leakages reducing the motor performance. Now, it is not necessary to use such a tooth profile along the whole height of the stator.

Figure 5:
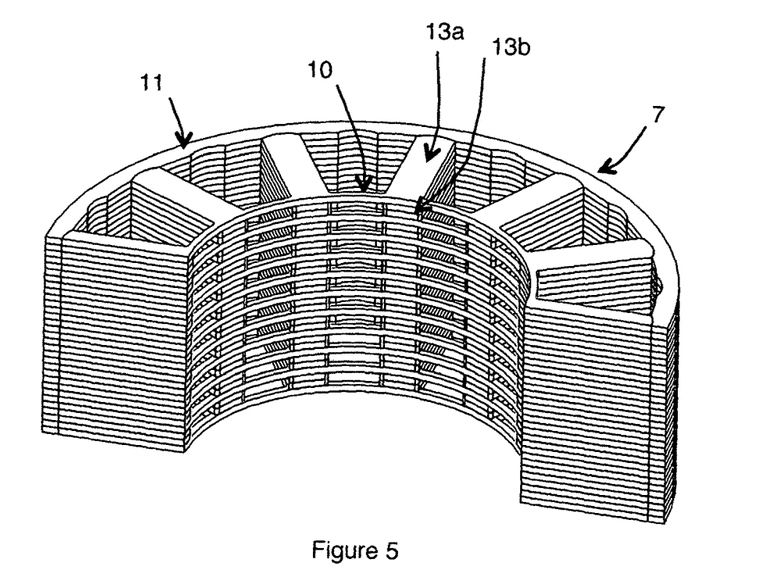
FIG. 5 shows a sectional view of a stator according to the invention in a secondary embodiment using alternating metal plates having, for some of them, saturable necks.

Using a stator 7—viewed in a section here—consisting of alternating metal plates 13a having necks 10 and metal plates 13b with no neck can thus be considered, like in FIG. 5. The winding of the stator teeth is then executed from the back of the teeth prior to the positioning of the outer ring 11 which provides the closing of the magnetic circuit. The ratio between the metal plates 13a having necks 10 and the metal plates 13b having none may be less than 1. Typically, using necks 10 on the equivalent of one third of the height only already leads to a good compromise for the residual torque without affecting the effective torque with a leaking flow at the necks 10.

This solution is efficient, but may thus complicate the winding process. Another solution consists in keeping the original stator structure, and then in adding one or more ring(s) made of a ferromagnetic material.

Figure 6:
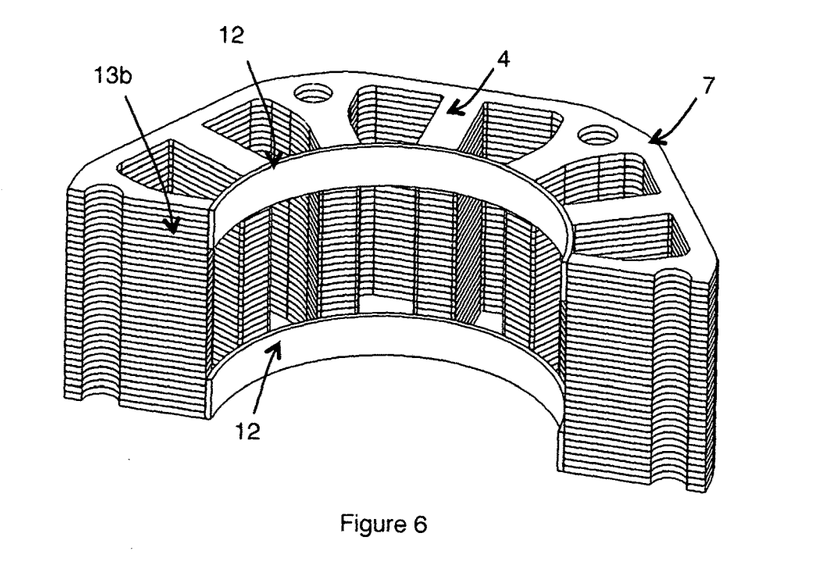
FIG. 6 shows a sectional view of a stator according to the invention in another secondary embodiment using ferromagnetic rings in the air gap in a first alternative solution.

FIG. 6 shows a first solution using ferromagnetic rings 12, directly in the air gap between the stator 7 and the rotor (not visible). As a matter of fact, these rings 12 are positioned in front of the narrow teeth 4 and make it possible to reduce the magnitude of the torque without current and to use only one type of metal plates 13b for the stator assembly 7. On the contrary, the air gap 15 between the stator 7 and the rotor (not visible) is slightly increased as a whole.

Figure 7:
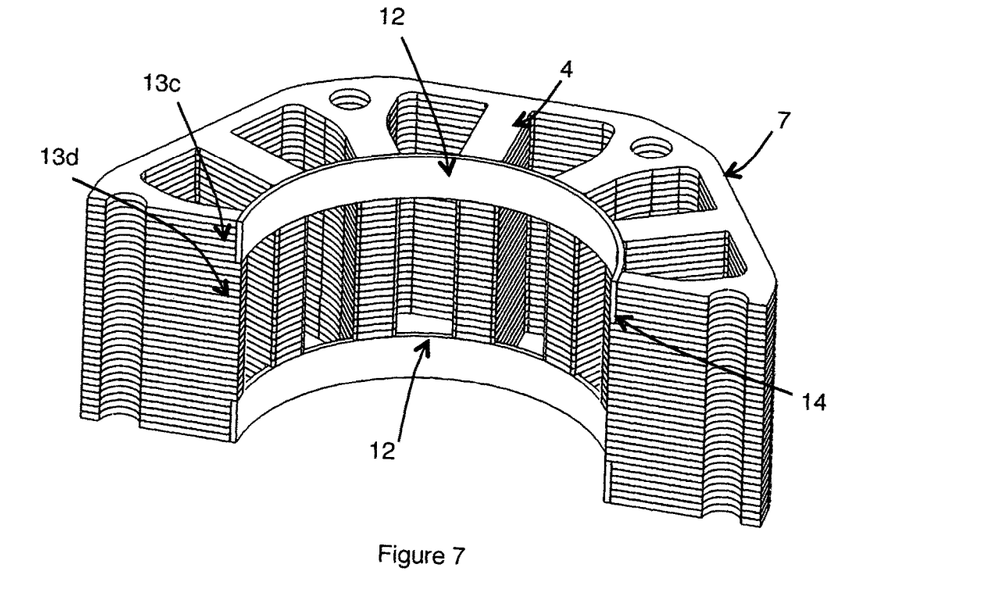
FIG. 7 shows a sectional view of a stator according to the invention in another secondary embodiment using ferromagnetic rings in the air gap in a second alternative solution.

Thus, another alternative consists in positioning the ferromagnetic rings 12 on either side of the metal plates stack, as illustrated in FIG. 7, using metal plates 13c and 13d having two different inner diameters so as to create a recess 14 adapted to receive the ring(s) 12. Although requiring a slight reduction in the depth of the coils 5, this solution has the advantage of making it possible to keep a small air gap 15.

Figure 8:
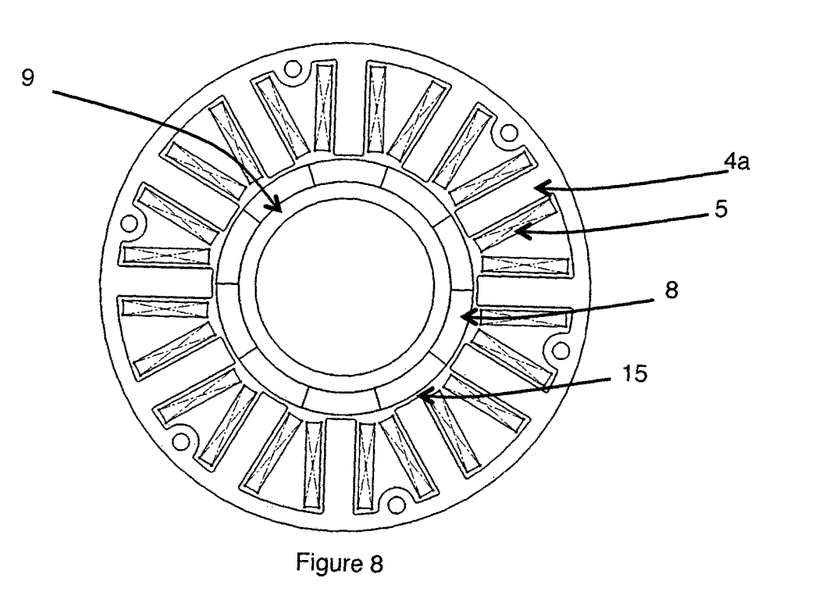
FIG. 8 shows a front view of a motor according to the invention in an embodiment using 5 pairs of poles and 12 wound narrow teeth.
Figure 9:
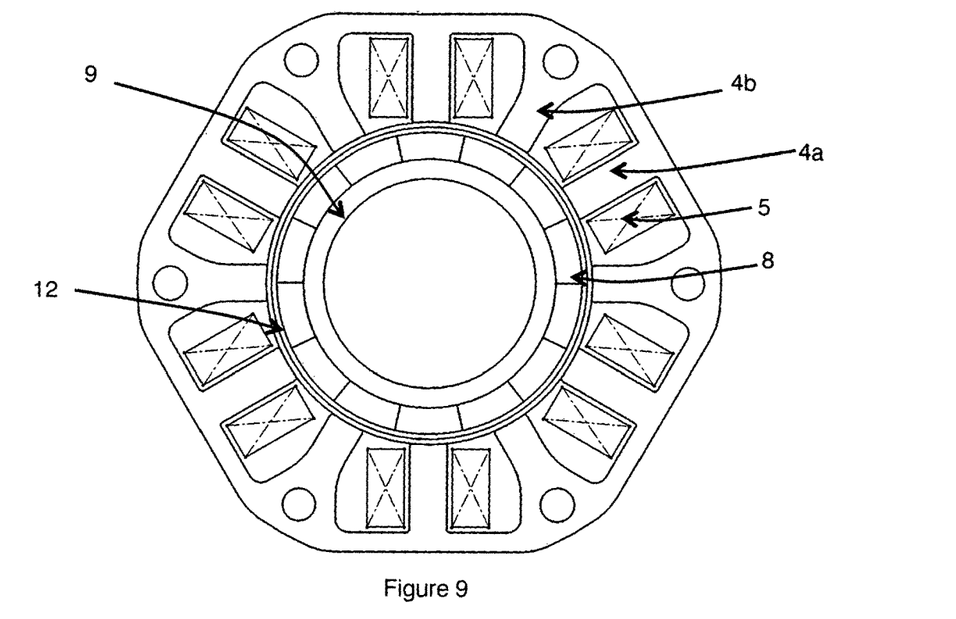
FIG. 9 shows a front view of a motor according to the invention in an embodiment using 7 pairs of poles and ferromagnetic rings in the air gap.

FIG. 8 shows a motor, according to the invention, having 12 identical narrow teeth 4a with each one carrying a coil 5. The rotor has 5 pairs of magnetic poles 8 carried by a yoke 9. FIG. 9 shows a motor having 12 narrow teeth with an equal peak divergence and 7 pairs of magnetic poles 8. One or more ferromagnetic ring(s) 12, the function of which has been described above, is/are positioned in the air gap 15 between the rotor and the stator 7.

Figure 10:
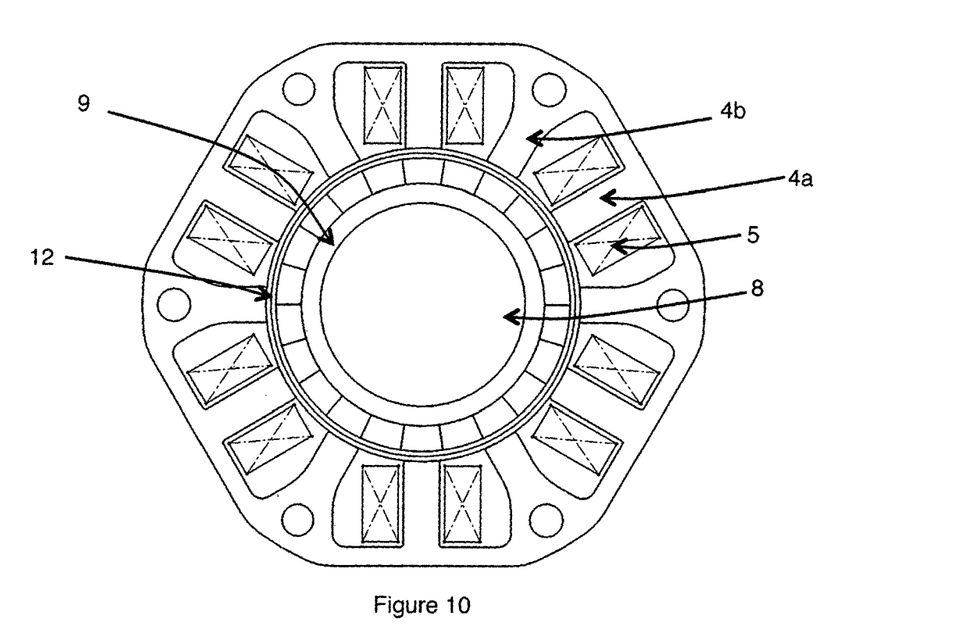
FIG. 10 shows a front view of a motor according to the invention in an embodiment using 11 pairs of poles and ferromagnetic rings in the air gap.

FIG. 10 shows a motor having 12 narrow teeth with an equal peak divergence and 11 pairs of magnetic poles 8. One or more ferromagnetic ring(s) 12, the function of which has been described above, is/are positioned in the air gap 15 between the rotor and the stator 7.

Figure 11:
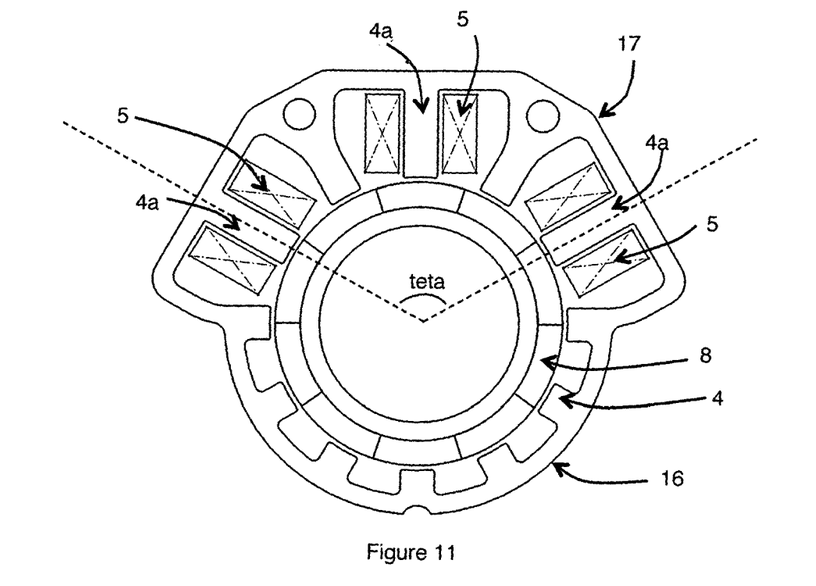
FIG. 11 shows a front view of a motor according to the invention in another embodiment using three coils positioned in a limited tooth pitch.

FIG. 11 shows another alternative embodiment intended to be used in an application requiring a small axial overall dimension (in the thickness of the stator, along the axis of rotation of the rotor). As a matter of fact, the motor has only three electric coils 5 carried by three teeth 4a on the stator, with the teeth being separated by a mechanical 60°, so that only one tooth out of two is wound and in an tooth pitch (theta) of only 120° as a whole. This configuration makes it possible to clear space on the opposite side of such formed tooth pitch (theta), so that, for example, a set of gears (not shown) providing a reduction in the speed of the rotor to move an external member (not shown) at a lower speed and a higher torque can be positioned. This geared motor can then be positioned as close as possible to the stator in a small axial and radial overall dimension opposite the tooth pitch (theta), thanks to a first outer radius 16 of the stator 7 smaller than the second outer radius 17 of the stator 7, wherein the part of the stator 7 where the coils are positioned 5 is inscribed.

Figure 12:
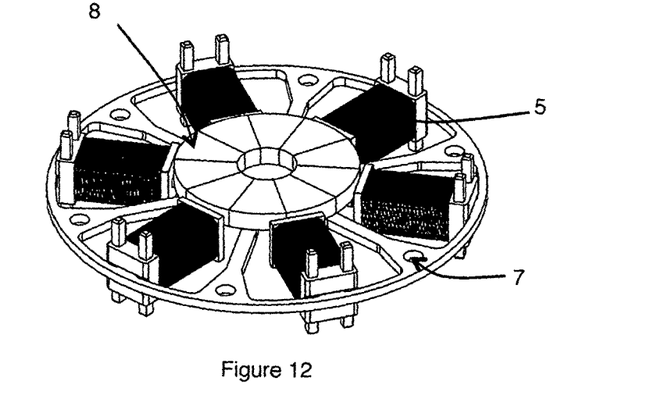
FIGS. 12 and 13 show an alternative solution of the invention with an axially magnetized disk rotor in two different views.
Figure 13:
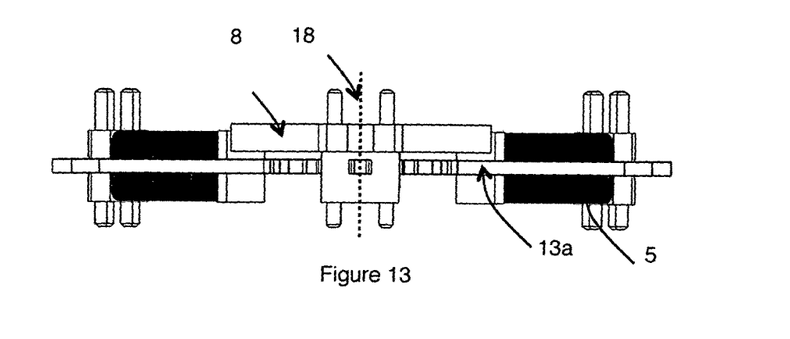

FIGS. 12 and 13 illustrate, in the case of a stator 7 having 6 coils 5, the possibility of using a disk-shaped magnet 8 having alternating axially magnetized poles (either parallel to the axis of rotation 18 or perpendicular to the radial extension of the stator 7). This type of magnet may be advantageous from an economic point of view, since a disk-shaped magnet is less expensive to develop as compared to a ring-shaped magnet, but also in terms of homogeneity of the material. This type of structure leads however to shortening the coils 5, or at least to recessing these radially, so that the magnet 8 can be positioned. In this exemplary non-restrictive embodiment, the stator 7 consists of a single metal plate 13a, but using several metal plates may be considered.

Figure 14:
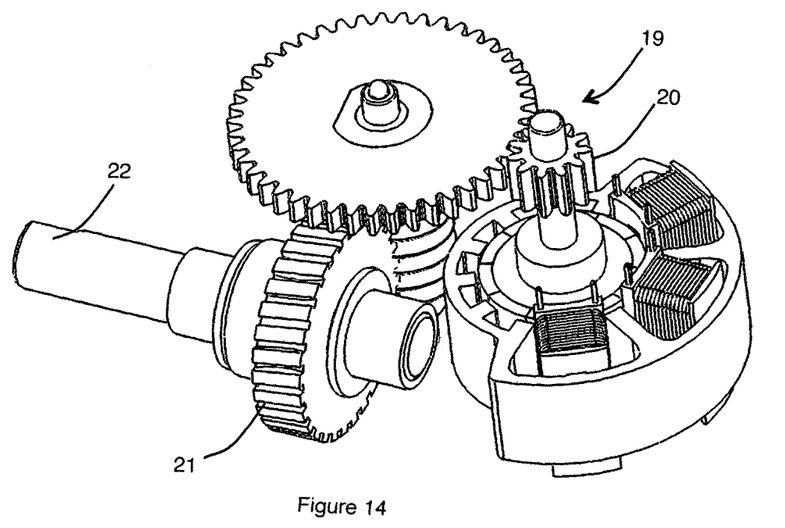
FIG. 14 shows an alternative embodiment.

FIG. 14 shows an exemplary non-restrictive embodiment of a geared motor using a motor according to the invention. The motor according to invention will be particularly advantageous when used in combination with a motion mechanical transformation system (reduction or multiplication) thus making it possible to obtain an efficient geared motor. As a matter of fact, the characteristics thereof of high torque density with current will make the geared motor compact and the low torque without current thereof will make a geared motor able to return in an often called "failsafe" position, when an elastic return system is positioned upstream or downstream of the mechanical transformation system.

FIG. 14 shows a motor according to the invention associated with a motion reduction system 19. The rotor of the motor meshes with a first meshing gear 20 and the last meshing gear 21 is integral with a mechanical output shaft 22 which an external member (not shown) to be moved may be associated with.

The invention claimed is:

1. A mono- or multiphase electric motor comprising a stator carrying at least three coils and 12×N straight teeth extending radially supporting the at least three coils, with N being an integer greater than or equal to 1, and of an equal peak divergence alpha, measured at their ends from a centre of the motor, and a rotor having P pairs of magnetized poles such that P=5+2×R, where P is a non-multiple of three, with R being an integer greater than or equal to 0, and alpha being between 360°/(12×N)/3 and 360°/(12×N)/2.

2. An electric motor according to claim 1, wherein alpha is between 360°/(12×N)/3 and 360°/(12×N)/2.1.

3. An electric motor according to claim 1, wherein one tooth out of two carries one of the at least three coils.

4. An electric motor according to claim 1, wherein all of the teeth carry the at least three coils.

5. An electric motor according to claim 1, wherein the coils are three in number, are installed on teeth spaced by 60° and generally distributed over a tooth pitch (theta) of less than or equal to 120°.

6. An electric motor according to claim 1, wherein the P pairs of poles on the rotor are magnetized radially.

7. An electric motor according to claim 1, wherein the P pairs of poles on the rotor are magnetized axially.

8. An electric motor according to claim 1, wherein the stator is formed by a stack of two types of different metal plates, with the adjacent stator teeth being in contact on the first type of metal plate by saturable magnetic necks.

9. An electric motor according to claim 1, wherein at least one ferromagnetic ring is in the air gap between the teeth of the stator and the magnetic rotor.

10. An electric motor according to claim 1, wherein the stator comprises two types of metal plates forming a recess adapted to receive a ferromagnetic ring.

11. An electric motor according to claim 1, wherein the stator has an outer ring positioned after a winding of the teeth so as to provide closing of a magnetic circuit.

12. An electric motor according to claim 1, wherein it has 5 pairs of magnetized poles and 12 straight teeth and, the peak divergence alpha is equal to 13°, with one tooth out of two being surrounded by one of the at least three coils, with two of the at least three coils spaced by a mechanical 180° round the centre of the motor forming an electric phase and the assembly of 6 coils forming a three-phase motor.

13. An electric motor according to claim 12, wherein the teeth which do not carry the coils have a bore in a portion flaring to form a peripheral belt.

14. A geared motor comprising a motor comprising:
a stator carrying at least three coils and 12×N straight teeth extending radially supporting the at least three coils, with N being an integer greater than or equal to 1, and of an equal peak divergence alpha, measured at their ends from a centre of the motor, and a rotor having P pairs of magnetized poles such that P=5+2×R, where P is a non-multiple of three, with R being an integer greater than or equal to 0, and alpha being between 360°/(12×N)/3 and 360°/(12×N)/2;
a motion mechanical transformation set; and
a shaft at the output of the transformation set.

15. The geared motor according to claim 14, wherein each of the teeth is wound by at least one of the at least three coils.

16. A geared motor comprising a motor comprising:
a stator carrying at least three coils, the stator having 12×N straight teeth extending radially supporting the at least three coils and having an equal peak divergence alpha, measured at their ends from a centre of the motor, being between 3600/(12×N)/3 and 3600/(12×N)/2, N being an integer greater than or equal to 1; and
a rotor having P pairs of magnetized poles such that P=5+2×R, P being a non-multiple of three and R being an integer greater than or equal to 0; and
a motion reduction system having a shaft at an output of the motion reduction system operably coupled to the rotor.

17. The geared motor according to claim 16, wherein the coils are three in number, are installed on teeth spaced by 60° and generally distributed over a tooth pitch (theta) of less than or equal to 120°.

18. The geared motor according to claim 16, wherein the stator is formed by a stack of two types of different metal plates, with the adjacent stator teeth being in contact on the first type of metal plate by saturable magnetic necks.

19. The geared motor according to claim 16, wherein at least one ferromagnetic ring is in the air gap between the teeth of the stator and the rotor.

20. The geared motor according to claim 16, wherein the stator comprises two types of metal plates forming a recess adapted to receive a ferromagnetic ring.

* * * * *